United States Patent [19]
Hecker

[11] 3,729,151
[45] Apr. 24, 1973

[54] REMOTE TARGET ACQUISITION AND LOCK-ON SYSTEM

[75] Inventor: Klaus J. Hecker, Oberursel, Germany

[73] Assignee: The United States of America as represented by the Secretary of the Navy

[22] Filed: Nov. 24, 1965

[21] Appl. No.: 510,165

[52] U.S. Cl. ............................................. 244/3.14
[51] Int. Cl. ............................................. F42b 15/02
[58] Field of Search ............... 244/3.1, 3.11, 3.14; 178/6.8

[56] References Cited

UNITED STATES PATENTS

| | | | |
|---|---|---|---|
| 2,924,652 | 2/1960 | Kramskoy | 244/3.14 |
| 2,955,777 | 10/1960 | Null et al. | 244/3.14 |
| 2,959,375 | 11/1960 | Dunnegan | 244/3.14 |
| 3,169,726 | 2/1965 | Jackson | 244/3.14 |

*Primary Examiner*—Verlin R. Pendegrass
*Attorney*—G. J. Rubens and J. M. St. Amand

EXEMPLARY CLAIM

1. A remote target acquisition and lock-on system for use with the control aircraft and an electro-optically guided missile which is launched prior to target acquisition, comprising:
   a. an area correlation type electro-optical television seeker means located in a guided missile and including a storage tube means, optical-axis axis torquing means and cross-hair generator means,
   b. a timing generator means also located in the missile for automatically causing said seeker means to store a new image in its storage tube at regular fixed intervals.
   c. a data link means located in the missile and consisting of a segment scan converter means, data transmitting means and command receiving means,
   d. a data receiver means, a storage display means, a control stick assembly, and command transmitter means all located in a control aircraft,
   e. said seeker means feeding an initial high-frame-rate video reference signal of the image of a scene to the segment scan converter means of said data link means,
   f. said segment scan converter means converting the high-frame-rate video signal to a low-frame-rate signal,
   g. said data transmitting means in the missile transmitting said low-frame-rate signal from the scan converter to said data receiver means in the control aircraft,
   h. the signal received by the data receiver means being displayed on said storage display means in the aircraft for visually determining whether the desired target appears in the displayed image,
   i. said control stick assembly being manually operable to generate commands which are fed to the command transmitting means in the aircraft and transmitted to the command receiving means in the missile for causing the optical axis of said seeker means to be torqued to look at another scene at each interval until the desired target is displayed on said display means in the aircraft,
   j. manually operable means in said control stick assembly operable to cause command signals to be transmitted at such time as a target image appears on said display for inhibiting said timing generator means from automatically re-cycling the storage tube of said seeker means at said regular fixed intervals and for generating tracking-mode cross-hairs on said aircraft, display means, said control stick assembly also including means operable to adjust said cross-hairs to fix on the target image and for producing a signal representing the position of said cross-hairs which is transmitted to the missile causing adjustment of reference voltages in said seeker means to correspond to the cross-hair position, whereby the missile seeker means is locked-on the target for tracking same.

2 Claims, 1 Drawing Figure

Patented April 24, 1973 3,729,151
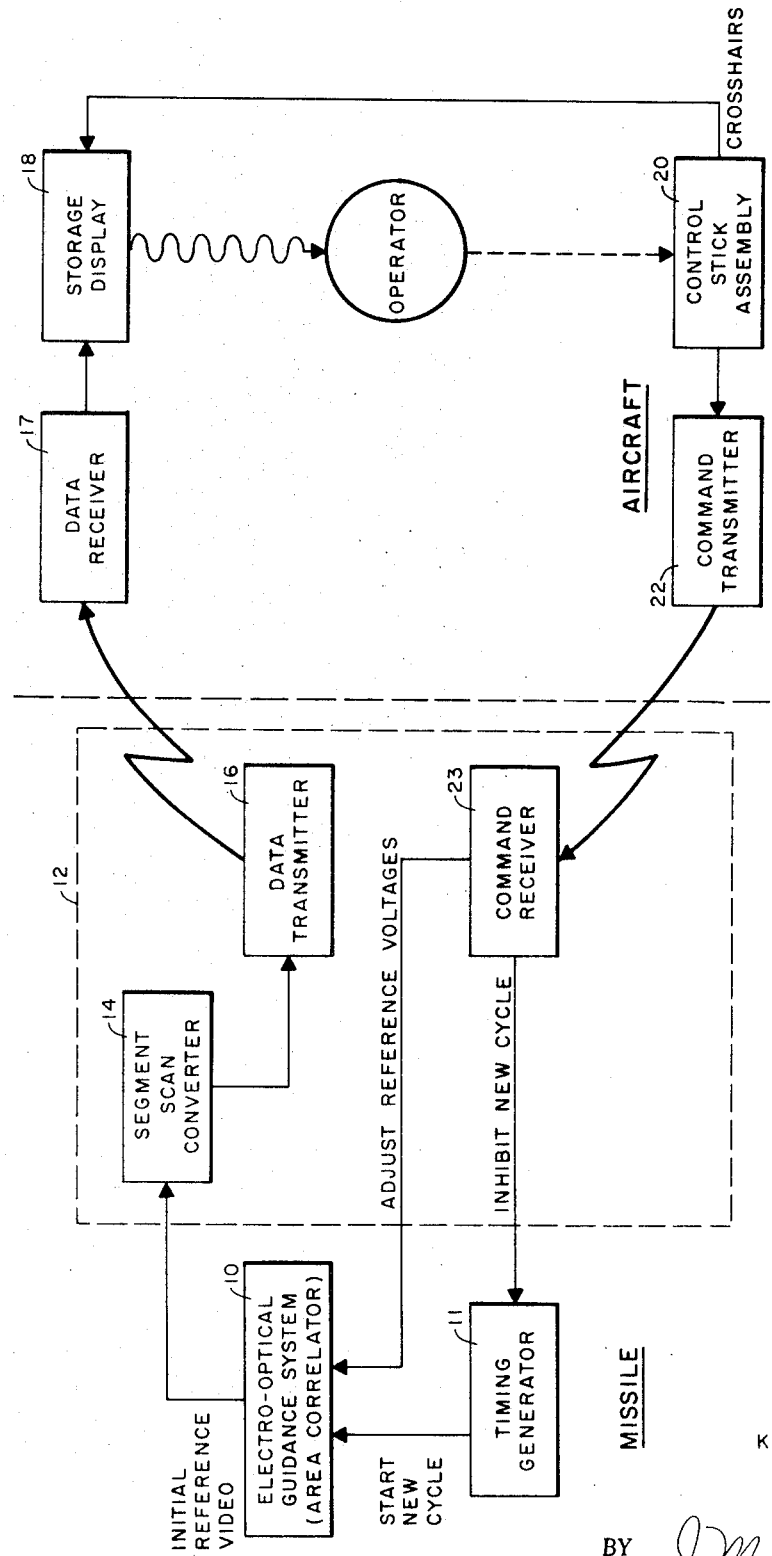
KLAUS J. HECKER
INVENTOR.
BY J. M. St. Amand
ATTORNEY

REMOTE TARGET ACQUISITION AND LOCK-ON SYSTEM

The invention herein described may be manufactured and used by or for the Government of the United States of America for governmental purposes without the payment of any royalties thereon or therefor.

This invention is related to guided missiles systems and is for use with electro-optically guided missiles of the type intended to be launched from an aircraft at a distance from a target at which neither the target nor the target area is discernible to the aircraft pilot, either by visual or by electro-optical means.

In this type system, by means of a data link, the electro-optical seeker or area correlator in the missile relays the image of the scene back to the control aircraft where it is displayed to the pilot. On the basis of general information on the target's position and its relationship to certain geographical landmarks, the pilot then navigates the missile to a position where the target is detected in the image of the scene so that he can initiate lock-on of the target by an automatic tracking system located in the missile seeker. An area-correlating type tracking system, to which the present invention is related, is disclosed in my co-pending U.S. Pat. application Ser. No. 510,167 for Target Area Sequential Correlator filed Nov. 24, 1965, and now abandoned.

The instant invention permits use of a low-frame-rate television data link between the missile and the control aircraft without encountering the problems of image smear and image motion that occur with conventional tracking systems when reduced camera frame rates are employed. Further, if reduced data rate were used with such prior systems, the operator may lock the system onto a point where the target is no longer located due to the delay in the missile/operator/missile loop. Any such errors involved in the initial lock-on would become evident, and correction could be attempted, only after the arrival of the next frame of information. Also, under normal operating conditions, such a prior system would place a considerable burden on the operator during the missile's terminal approach to a target, and under some conditions it would be impossible for the operator to achieve a proper lock-on unless the target was acquired when the missile was at a considerable distance away.

It is an object of the invention, therefore, to provide a usable low-data-rate communications link between electro-optically guided missiles and their control aircraft.

Another object of the invention is to provide a system permitting use of a low-frame-rate data link for electro-optically guided missiles without encountering problems of image smear and image motion.

A further object of the invention is to provide a new and improved remote target acquisition and lock-on system for electro-optically guided missiles.

Other objects and many of the attendant advantages of this invention will become readily appreciated as the same becomes better understood by reference to the following detailed description when considered in connection with the accompanying drawing wherein:

The FIGURE is a block diagram of missile and aircraft equipment for the system of this invention using target area sequential correlator type electro-optical missile guidance.

Referring to the drawing, during the navigation phase of flight, the seeker (area correlator) 10 is operated in an acquisition mode, in which it is programmed by means of timing generator 11 to store a new image in its storage tube at intervals of perhaps 10 seconds, for example. A video signal representing the reference image as it initially appears is obtained through the use of a double-ended storage tube, for example, and this signal is fed to the data link equipment 12 in the missile. Here the high-frame-rate video is by well known technique converted to a low-frame-rate signal by means of a segment scan converter 14. The complete frame of information constituting the reference image is then transmitted by a data transmitter 16 to a data receiver 17 in the launch aircraft over an interval of perhaps four seconds, for example. Thus, four seconds after the reference image is obtained, the complete image appears on the display 18 in the aircraft, and the operator has the following 6 seconds to determine whether or not the desired target appears on the reference image in the display. If it does not, the operator uses the control stick assembly 20 to generate commands that are transmitted via command transmitter 22 to command receiver 23 for causing the optical axis seeker 10 to be torqued in a new direction, and then waits for a new reference image to determine whether the target appears on that image. (If the operator does not send commands to torque the camera axis in a new direction during the 6-second interval, then at the end of that interval the camera axis automatically returns to the position at which it acquired the previous reference image and acquires a new reference image.) When a reference image is obtained in which the target image appears, the operator switches to the tracking mode in which the automatic re-cycling of the storage tube unit in seeker 10 by timing generator 11 is discontinued by command via assembly 20, command transmitter 22 and receiver 23, and a set of tracking-mode cross-hairs are generated in the aircraft and appear on display 18. The operator then adjusts the crosshairs so that they are fixed on the target, and a signal representing the position of the crosshairs is transmitted to the missile, causing adjustment of the reference voltages in the seeker system 10 crosshair generator to values corresponding to the crosshair position in the aircraft. The missile then tracks the target as identified by the operator, and there is no need for further correction of errors in the indicated lock-on point.

This system makes it possible to achieve lock-on with greater ease and certainty than afforded by prior systems, and also permits the use of a data link operating at a lower frame rate.

The reference image stored in the storage tube of seeker 10 must be read out and transmitted to the control aircraft. In addition to the use of a double-ended storage tube which permits read out of two different rasters at the same time, a single-ended storage tube can be used together with an electronic switch in the deflection generator, which connects the deflection system to the raster generator required for the area correlator during its forward trace and to another raster generator generating a normal, undistorted raster during retrace of the scanning beam; in such a system, the signal required for the area correlator would be generated during the forward trace of the beam and the signal required for the television data link to the control aircraft during retrace of the beam.

Alternately, a conventional low-frame-rate raster generator output signal can be compared with the output signal of the raster generator used in connection with the area correlator. The low-frame-rate raster generator serves as the deflection generator for the television link. Whenever both line and frame deflection signals of both deflection generators coincide, the storage tube beam of seeker 10 is pointing at an image element which has to be transmitted to the control aircraft. The information from this element is obtained by simply gating the storage tube output signal with the output of a coincidence circuit comparing the two deflection generator signals.

Obviously many modifications and variations of the present invention are possible in the light of the above teachings. It is therefore to be understood that within the scope of the appended claims the invention may be practiced otherwise than as specifically described.

What is claimed is:

1. A remote target acquisition and lock-on system for use with the control aircraft and an electro-optically guided missile which is launched prior to target acquisition, comprising:
    a. an area correlation type electro-optical television seeker means located in a guided missile and including a storage tube means, optical-axis torquing means and cross-hair generator means,
    b. a timing generator means also located in the missile for automatically causing said seeker means to store a new image in its storage tube at regular fixed intervals,
    c. a data link means located in the missile and consisting of a segment scan converter means, data transmitting means and command receiving means,
    d. a data receiver means, a storage display means, a control stick assembly, and command transmitter means all located in a control aircraft,
    e. said seeker means feeding an initial high-frame-rate video reference signal of the image of a scene to the segment scan converter means of said data link means,
    f. said segment scan converter means converting the high-frame-rate video signal to a low-frame-rate signal,
    g. said data transmitting means in the missile transmitting said low-frame-rate signal from the scan converter to said data receiver means in the control aircraft,
    h. the signal received by the data receiver means being displayed on said storage display means in the aircraft for visually determining whether the desired target appears in the displayed image,
    i. said control stick assembly being manually operable to generate commands which are fed to the command transmitting means in the aircraft and transmitted to the command receiving means in the missile for causing the optical axis of said seeker means to be torqued to look at another scene at each interval until the desired target is displayed on said display means in the aircraft,
    j. manually operable means in said control stick assembly operable to cause command signals to be transmitted at such time as a target image appears on said display for inhibiting said timing generator means from automatically re-cycling the storage tube of said seeker means at said regular fixed intervals and for generating tracking-mode cross-hairs on said aircraft display means, said control stick assembly also including means operable to adjust said cross-hairs to fix on the target image and for producing a signal representing the position of said cross-hairs which is transmitted to the missile causing adjustment of reference voltages in said seeker means to correspond to the cross-hair position, whereby the missile seeker means is locked-on the target for tracking same.

2. A remote target acquisition and lock-on system for use with the control aircraft and an electro-optically guided missile which is launched prior to target acquisition, comprising:
    a. an electro-optical seeker means located in a guided missile and including storage tube means, optical-axis torquing means and cross-hair generator means,
    b. timing means located in the missile for automatically causing said seeker means to store a new image in its storage tube at regular fixed intervals,
    c. data link means including scan converter means located in the missile and connected to said seeker means and timing means,
    d. storage display means and a control stick assembly located in a control aircraft,
    e. said seeker means feeding an initial high-frame-rate reference signal of the image of a scene to said scan converter means,
    f. said scan converter means converting the high-frame-rate signal to a low-frame-rate signal,
    g. said low-frame-rate signal from the scan converter being transmitted by said data link means to said control aircraft,
    h. the low-frame-rate signal being displayed on said storage display means in the aircraft for visually determining whether the desired target appears in the displayed image,
    i. said control stick assembly being manually operable to generate commands which are transmitted to the data link means in the missile for in-turn causing the optical axis of said seeker means to be torqued to look at another scene at each interval until the desired target is displayed on said display means in the aircraft,
    j. means in said control stick assembly operable to cause command signals to be transmitted at such time as a target image appears on said display for inhibiting said timing generator means from automatically re-cycling the storage tube of said seeker means at said regular fixed intervals and for generating tracking-mode cross-hairs on said aircraft display means, said control stick assembly also including means operable to adjust said cross-hairs to fix on the target image and for producing a signal representing the position of said cross-hairs which is transmitted to the missile causing adjustment of reference voltages in said seeker means to correspond to the cross-hair position, whereby the missile seeker means is locked-on the target for tracking same.

* * * * *